Nov. 17, 1942.   L. CRISTOFOLI   2,302,421
MOTOR
Filed June 19, 1940
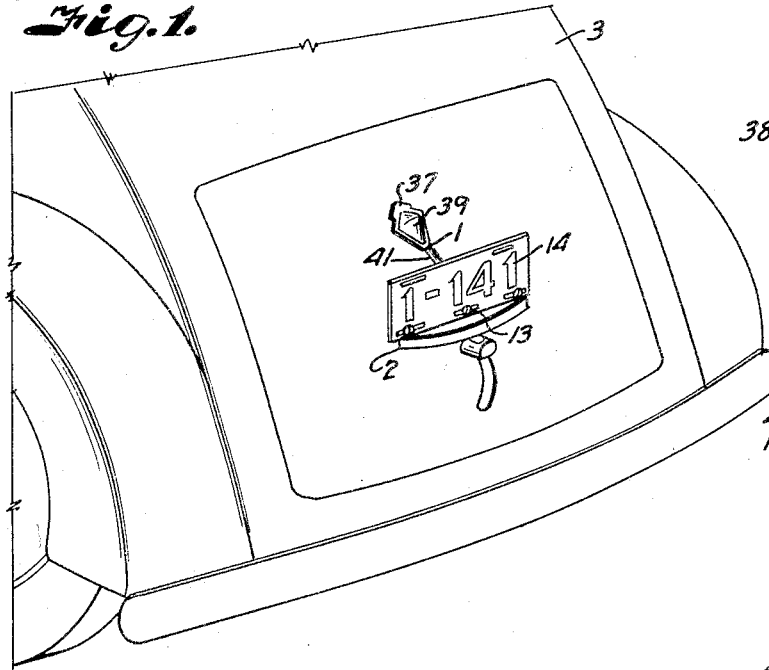
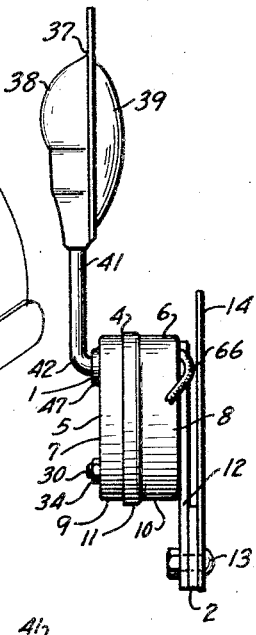
INVENTOR
Lodovico Cristofoli.
BY Arthur E. Brown
ATTORNEY Patented Nov. 17, 1942

2,302,421

UNITED STATES PATENT OFFICE 2,302,421

MOTOR

Lodovico Cristofoli, Kansas City, Mo.

Application June 19, 1940, Serial No. 341,271

7 Claims. (Cl. 172—126)

This invention relates to a motor for actuating animated signals particularly adapted for vehicles, and has for its principal object to provide a motor of this character that is of simple construction and relatively inexpensive to manufacture.

Other objects of the invention are to provide a signal actuating motor having a minimum of moving parts; to provide a construction wherein the moving elements are substantially counterbalanced and provided with shock-absorbing means; to provide a signal actuating motor with a simple snap-action switch of positive operation for controlling current flow to the oscillatory electromagnets thereof which actuate the signal; and to provide a flexible connection between the actuating motor and the signal element.

In accomplishing these and other objects of the invention, as hereinafter pointed out, I have provided improved details of structure, the preferred form of which is illustrated in the accompanying drawing, wherein:

Fig. 1 is a fragmentary perspective view of the rear portion of a vehicle equipped with a signal embodying the features of the present invention.

Fig. 2 is a side elevational view of the signal.

Fig. 3 is a detail elevational view of the actuating or motor mechanism.

Fig. 4 is a cross-section on the line 4—4 of Fig. 5.

Fig. 5 is a vertical section taken at right angles to the section shown in Fig. 4.

Fig. 6 is a detail perspective view of the switch contact arms.

Fig. 7 is a diagram of the electrical circuit.

Referring more in detail to the drawing:

1 designates an animated signal device adapted for mounting on the rear license plate bracket 2 of a motor vehicle 3. The device 1 includes a substantially cylindrical housing 4 composed of a pair of cup-shaped sections 5 and 6 having circular end walls 7 and 8 carrying flanges 9 and 10. One of the flanges, for example the flange 10, is provided with an offset 11 to receive the rim of the flange 9 as shown in Fig. 5, whereby the sections are retained in assembly to enclose the operating mechanism, later described. The housing 4 has a bracket-like arm 12 fixed to the end wall 8 and which is adapted to be connected with the license plate bracket 2 by fastening devices such as bolts 13, so that the housing is located to the rear of the license plate designated 14.

The entire operating mechanism of the signal is affixed to and carried by the section 5 of the housing and includes a pair of electromagnets 15 and 16 supported upon a rod-like core 19. The core 19 is of shorter length than the inner diameter of the housing section to allow for the desired amplitude of movement of the signal and carries spools 20 and 21 on which the windings of the magnets are wound. The spools are carried on the core in spaced axial relation with each other to accommodate a switch mechanism 22 therebetween. Located in the space between the magnets and fixed to the core thereof is an oscillatable arm 23 of sufficient length to support the electromagnets so the axis of the core is substantially in a horizontal diameter of the housing, the arm being pivoted on a pin 29.

Positioned within the section 5 of the housing is a reinforcement bracket 25 including a substantially arcuate-shaped body portion 26 closely engaging the annular wall 9 thereof and having ends 27 and 28 terminating slightly above the horizontal diameter of the housing to form pole pieces cooperating with the core of the electromagnets, the arcuate portion of the bracket being of sufficient thickness to provide the required metal necessary in establishing the electromotive force to effect oscillation of the magnets to and from their respective poles. A pin 29 includes a reduced threaded end 30 that is turned through an opening 31 in an ear 32 formed as a part of the bracket and which is preferably struck laterally from the arcuate-shaped body portion 26 to engage the inner face of the end wall 7 as shown in Fig. 5. The threaded extension forms a shoulder 33 which abuts against the face of the ear to cooperate with a jam-nut 34 to clamp the ear against the end of the housing, the threaded extension being of suitable length to project through a registering opening 35 in the end wall and to accommodate the jam-nut 34 as shown in Fig. 5. The arm 23 is preferably formed of a tube to accommodate a spring 36 therein, as later described.

The signalling element includes a lamp housing 37 substantially of arrow-head shape and having a recessed body portion 38 cooperating with a lens 39 to house an electric light bulb 40 carried by an arm 41 which supports the signal. The opposite end of the arm is bent laterally, as at 42, to provide a shaft 43 which journals in an opening 44 in the end 7 of the housing and in an ear 45 which depends from an arm 46 attached to the inner face of the flange 9 at a point directly opposite the pin 29. The opening 44 is preferably formed within an outstruck boss 47 of the housing to accommodate a gasket 48 which is retained in position by a washer-like plate 49 sleeved over the shaft 43 and suitably secured to the inner face of the wall 9, the washer preferably being provided with a collar to increase the bearing support of the shaft 43. The arm 41 is preferably formed of a tube to provide a conduit for leading a flexible conductor 50 to the light element previously described, the conductor entering the arm through an opening 51 formed in an end thereof which projects from the ear 45. Connected with the shaft 43 is an arm comprising a substantially staple-like member 52 having the loop portion 53 thereof projecting from the side of the shaft opposite the arm 41 and having the legs 54 and 55 thereof projecting through openings 56 and 57 of the shaft, the ends of the legs being bent over as indicated at 58.

The spring 36, previously referred to, has a hook 59 at one end thereof engaging the loop portion of the staple and its opposite end is provided with a similar hook 60 engaging a crosspin 61 extending transversely of the oscillating arm at a point above the pin 21 on which the post is mounted. The spring 36 is of such length that the arm 41 of the signal is normally retained in perpendicular position and the magnets are supported midway between the pole pieces. The spring thus forms a yieldable driving connection between the oscillating arm and the signal element, whereby forced movement of the signal arm merely stretches the spring without damaging the operating mechanism.

The inner flanges of the magnet spools are preferably provided with forwardly extending ears 62 and 63 carrying facing contacts 64 and 65 to which the outer ends of the windings of the electromagnets are connected, the end of the electromagnet 16 being connected with the contact 64 and the end of the electromagnet 15 being connected with the contact 65. The inner ends of the electromagnet windings are interconnected and supplied with a suitable energizing current through a conductor 66 also connected with the flexible conductor 50 previously mentioned.

The switch contact element is best illustrated in Fig. 6 and includes spring-like leaves 67 and 68 connected at their lower ends as by solder 69 with a spring-like tongue 70.

The switch assembly thus described is fixed within a recess 71 provided at the terminal end of the pin 29 as shown in Fig. 5. The contact arms 67 and 68 are of sufficient length and spacing to alternately engage the contacts 64 and 65 but the tongue 70 is of longer length than the spacing between the pin 29 and the ear 45. The ear 45 is provided with a downwardly facing notch 72 to engage a similar notch 73 in the tongue so that the tongue is normally retained in bowed condition between the contact arms 67 and 68 whereby the contact on the bowed side of the arm is retained in engagement with its contact to energize the electromagnet at the opposite side, the electromagnet setting up a magnetic field whereby the magnet assembly moves in the direction of the pole piece to effect oscillation of the post 23. As the post and magnet assembly move toward the pole piece, the contacting arm of the switch presses against the bowed tongue and as the assembly moves past center the tongue is bowed in the opposite direction to cause the other contact arm to engage its contact to energize the other of the electromagnets, whereupon direction of movement is reversed, causing oscillation of the assembly and a corresponding oscillation of the signal arm incidental to its connection with the oscillating post 23 through the spring 36. The spring, being carried by the assembly and connected with the staple-like member 52 as above described, effects movement of the signal in an opposite direction to the movement of the actuating mechanism so that the actuating mechanism substantially balances the signal element to provide a smooth-acting mechanism. When the electromagnet assembly moves to one pole piece, in order to cushion the movement of the assembly, the coil spring is loaded to reverse the movement when the current is shifted to the other coil, the spring again being loaded as the mechanism moves through its dead center position.

In mounting the signal on the vehicle, the conductor 66 is connected with the stop light circuit so that when the stop light is energized, the magnets are alternately energized to effect oscillation of the signal. When the circuit is interrupted to the stop lights, the spring 36 automatically returns the moving parts of the signal to neutral position with one of the contact arms 67 or 68 engaging one of the contacts so that one of the electromagnets is always in position to effect starting of the signal when the circuit is again established.

From the foregoing it is obvious that I have provided a simple and inexpensive switch construction having a movement which more easily attracts the attention of drivers in following vehicles. It is also obvious that the yieldable connection between the oscillating signal element and its actuating mechanism cushions the force of the oscillations and also serves to protect the actuating mechanism in case the signal element should be moved a greater distance than that afforded by the actuating mechanism.

What I claim and desire to secure by Letters Patent is:

1. In a device of the character described, a housing, spaced poles in the housing, a pair of electromagnets including a core, an arm pivotally mounted in the housing and connected with the core to oscillatably carry the electromagnets between said poles, an electric circuit for said electromagnets, a pair of contacts movably supported with the electromagnets and connected in said circuit, a pair of switch arms alternately engageable with the contacts upon oscillation of said electromagnets, and a bow spring positioned between said arms and having the ends supported in fixed position within the housing whereby the bow is adapted to change position by contact therewith of one of the contact arms incidental to oscillation of the electromagnets to effect engagement of the other arm with its contact to alternately effect energization of the electromagnets.

2. In a device of the character described, a housing, spaced poles in the housing, a pair of electromagnets including a core, an arm pivotally mounted in the housing and connected with the core to oscillatably carry the electromagnets between said poles, an electric circuit for said electromagnets, a pair of contacts movably supported with the electromagnets and connected in said circuit, a pair of switch arms alternately engageable with the contacts upon oscillation of said electromagnets, a bow spring positioned between said arms and having the ends supported in fixed position within the housing and adapted to change the position of said bow incidental to oscillation of the electromagnets to effect alternate snap-action engagement of the switch arms with said contacts to alternately energize the electromagnets, a shaft journalled in the housing, an arm on the shaft, and a yieldable connection between said electromagnet supporting arm and said shaft arm.

3. In a device of the character described, a housing, spaced poles in the housing, a pair of electromagnets including a core, an arm pivotally mounted in the housing and connected with the core to oscillatably carry the electromagnets between said poles, an electric circuit for said electromagnets, a pair of contacts movably supported with the electromagnets and connected in said circuit, a pair of switch arms alternately engageable with the contacts upon oscillation of said electromagnets, a bow spring positioned between said arms and having the ends supported in fixed position within the housing and adapted to change the position of said bow incidental to oscillation of the electromagnets to effect alternate engagement of the switch arms with said contacts to alternately energize the electromagnets, a shaft journalled in the housing, an arm on the shaft, and an expansion spring connecting said shaft arm with the electromagnet supporting arm to effect an oscillating connection between said shaft and the electromagnets.

4. In a device of the character described, a housing, a pole member in the housing including an arcuate-shaped body having ends terminating in poles, an ear carried by said body intermediate the poles, a pin projecting laterally from the ear, an arm pivoted on said pin, a pair of electromagnets supported at the respective sides of said arm in substantial registry with said poles, and means for alternately energizing said magnets.

5. In a device of the character described, a housing, a pole member in the housing including an arcuate-shaped body having ends terminating in poles, an ear carried by said body intermediate the poles, a pin projecting laterally from the ear, an arm pivoted on said pin, a pair of electromagnets supported at the respective sides of said arm in substantial registry with said poles, a bracket carried by the housing on the side opposite said pole member, a leaf spring of longer length than the spacing between said bracket and pin and having ends connected therewith to produce a reversible curve in said spring, a pair of contact arms fixed to one end of the leaf spring, a pair of spaced electric contacts projecting from the electromagnet supporting arm on the outer sides of said switch arms and adapted to be engaged by one of said switch arms to effect reversal of the curved portion of said leaf spring to drive the other switch arm in engagement with its contact incidental to oscillation of the electromagnets, conductors connecting the electromagnets with said contacts, a current supply, means connecting one terminal of the current supply to said switch arm, and means connecting the other terminal of the current supply to said electromagnets.

6. A device of the character described including, a housing, an arm having oscillatory support in one side of the housing and having a free end extending toward the opposite side of the housing, a shaft journalled in said opposite side of the housing, an arm on said shaft extending toward said first named arm, a spring interconnecting said arms, a pair of related electromagnet and pole members in the housing on the respective sides of the first named arm, one member of each pair being supported by said first named arm, a source of current supply, an alternating snap action switch in the housing, and means connecting the alternating snap action switch in circuit with the electromagnets and with the source of current supply to effect alternate energization of the electromagnets and oscillation of said first named arm to effect reverse oscillation of the second named arm through said spring, said switch being adapted for actuation responsive to movement of one of said arms.

7. A device of the character described including, a housing, an arm having oscillatory support in one side of the housing and having a free end extending toward the opposite side of the housing, a shaft journalled in said opposite side of the housing, an arm on said shaft extending toward said first named arm, a spring interconnecting said arms, a pair of oppositely disposed electromagnets carried by said arm, pole means supported in said housing, a source of current supply, an alternating snap action switch in the housing, and means connecting the alternating snap action switch in circuit with the electromagnets and with the source of current supply to effect alternate energization of the electromagnets and oscillation of said first named arm to effect reverse oscillation of the second named arm through said spring, said switch being adapted for actuation responsive to movement of one of said arms.

LODOVICO CRISTOFOLI.